US012645160B2

(12) United States Patent
Zhu et al.

(10) Patent No.: US 12,645,160 B2
(45) Date of Patent: Jun. 2, 2026

(54) SCRATCH-RESISTANT AND DURABLE ELECTROPHOTOGRAPHIC PHOTORECEPTOR

(71) Applicant: Nano and Advanced Materials Institute Limited, Hong Kong (HK)

(72) Inventors: Yong Zhu, Hong Kong (HK); Yubo Cheng, Hong Kong (HK); Shiwei Qin, Hong Kong (HK); Chenmin Liu, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 541 days.

(21) Appl. No.: 18/315,471

(22) Filed: May 10, 2023

(65) Prior Publication Data

US 2023/0367235 A1 Nov. 16, 2023

Related U.S. Application Data

(60) Provisional application No. 63/340,931, filed on May 11, 2022.

(51) Int. Cl.

*G03G 5/05* (2006.01)
*G03G 5/147* (2006.01)

(52) U.S. Cl.

CPC ....... *G03G 5/0592* (2013.01); *G03G 5/14752* (2013.01); *G03G 5/14756* (2013.01)

(58) Field of Classification Search

CPC ............. G03G 5/0592; G03G 5/14752; G03G 5/14756

See application file for complete search history.

(56) References Cited

U.S. PATENT DOCUMENTS

| | | | | |
|---|---|---|---|---|
| 4,792,507 | A | 12/1988 | Yoshihara et al. | |
| 7,838,190 | B2 | 11/2010 | Ogaki et al. | |
| 7,851,112 | B2 | 12/2010 | Wu et al. | |
| 7,897,314 | B1 | 3/2011 | Wu et al. | |
| 8,338,064 | B2 | 12/2012 | Tajima et al. | |
| 8,980,511 | B2 | 3/2015 | Zhou et al. | |
| 11,175,599 | B2 | 11/2021 | Nonaka et al. | |
| 2012/0237862 | A1* | 9/2012 | Yu ........................ | G03G 15/754 430/58.8 |
| 2021/0124280 | A1 | 4/2021 | Mori et al. | |

* cited by examiner

*Primary Examiner* — Mark F. Huff
*Assistant Examiner* — Boone Alexander Evans
(74) *Attorney, Agent, or Firm* — IDEA Intellectual Limited; Sam T. Yip

(57) ABSTRACT

An electrophotographic photoreceptor, which includes a conductive substrate; an undercoat layer disposed on the conductive substrate and capable of conforming to the contour of the conductive substrate, a photoconductor charge generation layer disposed on the undercoat layer and capable of conforming to the contour of the undercoat layer, and a charge transport layer disposed on the photoconductor charge generation layer. The charge transport layer contains a charge transport material, a binder resin, a fluorine-containing resin, and a plurality of polyhedral oligomeric silsesquioxane (POSS) particles evenly dispersed in the binder resin, and the POSS particles are interconnected with at least one fluorine group and at least two non-fluoridated groups. By adding approximately 1% of the POSS particles and lubricant nanoparticles, a life-time improvement of at least 20% is achieved for an OPC drum.

12 Claims, 4 Drawing Sheets

SCRATCH-RESISTANT AND DURABLE ELECTROPHOTOGRAPHIC PHOTORECEPTOR

CROSS-REFERENCE TO RELATED APPLICATIONS

The present application claims the priority from the U.S. provisional patent application Ser. No. 63/340,931 filed May 11, 2022, and the disclosure of which is incorporated herein by reference in its entirety.

FIELD OF THE INVENTION

The present invention generally relates to the technical field of organic photoconductor coating. In particular, it relates to a modified polyhedral oligomeric silsesquioxane (POSS) in the charge transport layer and the overcoat layer.

BACKGROUND OF THE INVENTION

The prevalence of different kinds of personal electronic devices has brought along an increased interest in printers. In particular, electrophotographic printers have seen large market share. The organic photoconductor (OPC) is one of the key components in the electrophotographic printer. OPC is a thin photoconductive layer. An electrostatic latent image is formed on the pre-charged OPC surface through optical exposure. The latent image is then transferred from the OPC to the charged marking particles on the printing medium, typically, a piece of paper. The charged marking particles which bear the pattern will then be fixed on the printing medium through a developing process that involves color toner.

Conventional OPCs have four layers, namely, a conductive substrate, an undercoat layer, a charge generation layer (CGL), and a charge transport layer (CTL). The four layers are disposed one over another with uniform structural, electrical and optical properties. The quality of the prints depends on the even distribution of the charged marking particles.

The surface layer of an OPC, which is usually a CTL or sometimes an additional overcoat layer, has an important role in the durability of the OPC. The surface layer has to shield the OPC from physical impacts brought by mechanical, physicochemical, and electrical interaction between the surface layer and many other materials used in the electrophotographic process. A common approach to ensure the durability of the surface layer is to increase the hardness and lubricity. Alternatively, durability can be improved by reducing surface fraction of the surface layer.

U.S. Pat. No. 4,792,507 discloses an electrophotographic photosensitive member having a photosensitive layer on an electroconductive substrate comprises a surface layer containing a fluorine type resin powder and a fluorine type graft polymer. U.S. Pat. No. 8,338,064 discloses a polycarbonate resin composition comprising specific silicone-modified polyurethane and electrophotographic photosensitive body using the same. U.S. Pat. No. 7,838,190 provides a surface layer of the electrophotographic photosensitive member including a polymer having a specific repeating structural unit and fluorine-atom-containing resin particles. US Patent Publication No. 2021/0124280 and U.S. patent Ser. No. 11/175,599 develop a protective layer on the electrophotographic photosensitive member containing crosslinkable hole-transporting compounds having two or more (meth) acryloyloxy groups and a fluorine-containing dispersion.

While these patents attempt to increase the durability of the OPC layer, there remains a need for improved coatings on OPC layers to increase the lifetime of the OPC component in printers.

SUMMARY OF THE INVENTION

This section is for the purpose of summarizing some aspects of embodiments of the invention and to briefly introduce some preferred embodiments. In this section, as well as in the abstract and the title of the invention of this application, simplifications or omissions may be made to avoid obscuring the purpose of the section, the abstract and the title, and such simplifications or omissions are not intended to limit the scope of the invention.

The present invention has been made in view of the above-mentioned problem of surface layer durability of an electrophotographic photoreceptor. The surface layer in the electrophotographic photoreceptor of the present invention has modified POSS particles. The modified POSS particle has a rigid inorganic core that is formed by a Si—O cage which provides the hardness of the surface layer. Fluorine groups and non-fluoridated groups are interconnected with the POSS particle. The fluorine groups provide lubricity and interact with other fluorine-containing particles. The non-fluoridated groups interact with the non-fluoridated particles. The combined effect is the even dispersion of the modified POSS particles because of high compatibility among the components and steric stabilization of the Si—O cage. These properties will increase the durability of the electrophotographic photoreceptor.

A first aspect of the present invention provides a scratch-resistant and durable electrophotographic photoreceptor. The electrophotographic photoreceptor includes a conductive substrate, an undercoat layer disposed on the conductive substrate and capable of conforming to the contour of the conductive substrate, a photoconductor charge generation layer disposed on the undercoat layer and capable of conforming to the contour of the undercoat layer, and a charge transport layer disposed on the photoconductor charge generation layer. The charge transport layer includes a charge transport material, a binder resin, a fluorine-containing resin, and a plurality of polyhedral oligomeric silsesquioxane (POSS) particles evenly dispersed in the binder resin, and the POSS particles are interconnected with at least one fluorine group and at least two non-fluoridated groups. The POSS particles are evenly dispersed in the binder resin due to the attraction between the fluorine group and the fluorine-containing resin and the attraction between the first non-fluoridated group and the binder resin.

In accordance with one embodiment of the present invention, a surface of the conductive substrate interacts with the undercoat layer and undergoes an electrochemical treatment comprising positive electrode oxidation, blast processing, cutting process.

In accordance with one embodiment of the present invention, the charge transport material is selected from the group consisting of polycyclic aromatic compounds, heterocyclic compounds, hydrazone compounds, styryl compounds, enamine compounds, benzidine compounds and triarylamine compounds.

In accordance with one embodiment of the present invention, the binder resin is selected from the group consisting of polyester resin, a polycarbonate resin, an acryl resin and a polystyrene resin.

In accordance with one embodiment of the present invention, the fluorine-containing resin is selected from the group consisting of tetrafluoroethylene resin, trifluorochloroethylene resins, vinyl fluoride resins, vinylidene fluoride resins, difluorodichloroethylene resins and copolymers thereof.

In accordance with one embodiment of the present invention, the POSS particles has a structure of Formula (1-1) or Formula (1-2):

$$R^aR^1SiO_{3/2} \quad \text{Formula (1-1)}$$

$$R^aR^1R^2SiO_{3/2} \quad \text{Formula (1-2),}$$

$R^a$ represents the at least one fluorine group, $R^1$ represents a first non-fluorine group of the at least two non-fluoridated groups, and $R^2$ represents a second non-fluorine group of the at least two non-fluoridated groups, and the second non-fluorine group has a long chain of $CH_2$ of more than $1CH_2$.

In accordance with one embodiment of the present invention, a content of the fluorine-containing POSS in the charge transport layer ranges from 0.1% to 20% by mass.

In accordance with one embodiment of the present invention, the fluorine group is a monovalent group having at least one of a fluoroalkyl group and a fluoroalkylene group.

In accordance with one embodiment of the present invention, the fluorine group is selected from the group consisting of 12,12,13,13,14,14,15,15,16,16,17,17,18,18,19,19,19-heptadecafluorononadecyl, 12,12,13,13,14,14,15,15,15-nonafluoropentadecyl, 12,12,13,13,14,14,15,15,16,16,17,17,17-tridecafluoroheptadecyl, 12,12,13,13,14,14,15,15,15-nonafluoropentadecyl, 12,12,13,13,14,14,15,15,16,16,17,17,18,18,19,19,19-heptadecafluorononadecyl, 12,12,13,13,14,14,15,15,16,16,17,17,17-tridecafluoroheptadecyl, 3,3,3-trifluoropropyl, heptadecafluorodecyl, tridecafluorooctyl, 3,3,3-trifluoropropyl, 1H,1H,2H,2H-perfluorodecyl, heptadecafluorooctyl, heptadecafluoro-1,1,2,2-tetradecyl and tridecafluoro-1,1,2,2-tetrahydrooctyl.

In accordance with one embodiment of the present invention, the first non-fluorine group of the at least two non-fluoridated groups is selected from the group consisting of propyl methacrylate, propylaniline, phenyl, 2-phenylethyl, 1-phenylethenyl, methylphenyl group and diphenyl group. A first molar ratio between the fluorine group and the first non-fluorine group ranges from 1:100 to 100:1.

In accordance with one embodiment of the present invention, the second non-fluorine group of the at least two non-fluoridated groups is selected from the group consisting of octadecyl, dodecyl, and polyethylene glycol (PEG). A second molar ratio between the fluorine group and the combination of the first non-fluorine group and the second non-fluorine group ranges from 1:100 to 100:1.

In accordance with one embodiment of the present invention, the undercoat layer has a thickness in a range of 15 μm to 50 μm, the photoconductor charge generation layer has a thickness in a range of 0.1 μm to 1 μm, and the charge transport layer has a thickness in a range of 5 to 50 μm.

In accordance with one embodiment of the present invention, by adding approximately 1% of the POSS particles and lubricant nanoparticles, a life-time improvement of at least 20% is achieved for an OPC drum.

The scratch-resistant and durable electrophotographic photoreceptor has a durability of at least below 1.0 um/10000 page printing in OPC CTL thickness reduction, as determined by standard page printing test according to ISO/IEC 19752.

A second aspect of the present invention provides another type of scratch-resistant and durable electrophotographic photoreceptor. The electrophotographic photoreceptor includes a conductive substrate, an undercoat layer disposed on the conductive substrate and capable of conforming to the contour of the conductive substrate, a photoconductor charge generation layer disposed on the undercoat layer and capable of conforming to the contour of the undercoat layer, a charge transport layer disposed on the photoconductor charge generation layer, and an overcoat layer disposed on the charge transport layer. The charge transport layer includes a charge transport material, a binder resin. The overcoat layer includes a fluorine-containing resin and a plurality of polyhedral oligomeric silsesquioxane (POSS) particles evenly dispersed in the fluorine-containing resin. The POSS particles are interconnected with at least one fluorine group and at least two non-fluoridated groups. The POSS particles are evenly dispersed in the resin due to the attraction between the fluorine group and the fluorine-containing resin and the attraction between the first non-fluoridated group and the binder resin.

In accordance with one embodiment of the present invention, a surface of the conductive substrate interacts with the undercoat layer and undergoes an electrochemical treatment comprising positive electrode oxidation, blast processing, cutting process.

In accordance with one embodiment of the present invention, the charge transport material is selected from the group consisting of polycyclic aromatic compounds, heterocyclic compounds, hydrazone compounds, styryl compounds, enamine compounds, benzidine compounds and triarylamine compounds.

In accordance with one embodiment of the present invention, the binder resin is selected from the group consisting of polyester resin, a polycarbonate resin, an acryl resin and a polystyrene resin.

In accordance with one embodiment of the present invention, the fluorine-containing resin is selected from the group consisting of tetrafluoroethylene resin, trifluorochloroethylene resins, vinyl fluoride resins, vinylidene fluoride resins, difluorodichloroethylene resins and copolymers thereof.

In accordance with one embodiment of the present invention, the POSS particles has a structure of Formula (1-1) or Formula (1-2):

$$R^aR^1SiO_{3/2} \quad \text{Formula (1-1)}$$

$$R^aR^1R^2SiO_{3/2} \quad \text{Formula (1-2),}$$

$R^a$ represents the at least one fluorine group, $R^1$ represents a first non-fluorine group of the at least two non-fluoridated groups, and $R^2$ represents a second non-fluorine group of the at least two non-fluoridated groups, and the second non-fluorine group has a long chain of $CH_2$ of more than $1CH_2$.

In accordance with one embodiment of the present invention, a content of the fluorine-containing POSS in the charge transport layer ranges from 0.1% to 20% by mass.

In accordance with one embodiment of the present invention, the fluorine group is a monovalent group having at least one of a fluoroalkyl group and a fluoroalkylene group.

In accordance with one embodiment of the present invention, the fluorine group is selected from the group consisting of 12,12,13,13,14,14,15,15,16,16,17,17,18,18,19,19,19-heptadecafluorononadecyl, 12,12,13,13,14,14,15,15,15-nonafluoropentadecyl, 12,12,13,13,14,14,15,15,16,16,17,17,17-tridecafluoroheptadecyl, 12,12,13,13,14,14,15,15,15-nonafluoropentadecyl, 12,12,13,13,14,14,15,15,16,16,17,17,18,18,19,19,19-heptadecafluorononadecyl, 12,12,13,13,14,14,15,15,16,16,17,17,17-tridecafluoroheptadecyl, 3,3,3-trifluoropropyl, heptadecafluorodecyl, tridecafluorooctyl, 3,3,3-trifluoropropyl, 1H,1H,2H,2H-perfluorodecyl, heptadecafluorooctyl, heptadecafluoro-1,1,2,2-tetradecyl and tridecafluoro-1,1,2,2-tetrahydrooctyl.

In accordance with one embodiment of the present invention, the first non-fluorine group of the at least two non-fluoridated groups is selected from the group consisting of propyl methacrylate, propylaniline, phenyl, 2-phenylethyl, 1-phenylethenyl, methylphenyl group and diphenyl group. A first molar ratio between the fluorine group and the first non-fluorine group ranges from 1:100 to 100:1.

In accordance with one embodiment of the present invention, the second non-fluorine group of the at least two non-fluoridated groups is selected from the group consisting of octadecyl, dodecyl, and polyethylene glycol (PEG). A second molar ratio between the fluorine group and the combination of the first non-fluorine group and the second non-fluorine group ranges from 1:100 to 100:1.

In accordance with one embodiment of the present invention, the undercoat layer has a thickness in a range of 15 μm to 50 μm, the photoconductor charge generation layer has a thickness in a range of 0.1 μm to 1 μm, the charge transport layer has a thickness in a range of 5 to 50 μm, and the overcoat layer has a thickness in a range of 5 to 50 μm.

The scratch-resistant and durable electrophotographic photoreceptor has been testified by wear-resistance in printing, in which the present invention can provide below 1.0 um OPC CTL thickness reduction per 10000 page printing, while the commercial one is of 1.2 um thickness reduction per 10000 page printing.

BRIEF DESCRIPTION OF THE DRAWINGS

Embodiments of the invention are described in more details hereinafter with reference to the drawings, in which.

DETAILED DESCRIPTION

In order to make the aforementioned objects, features and advantages of the present invention comprehensible, embodiments accompanied with figures are described in detail below.

In the following description, numerous specific details are set forth in order to provide a thorough understanding of the present invention, but the present invention may be practiced in other ways than those specifically described and will be readily apparent to those of ordinary skill in the art without departing from the spirit of the present invention, and therefore the present invention is not limited to the specific embodiments disclosed below.

Figure 1:
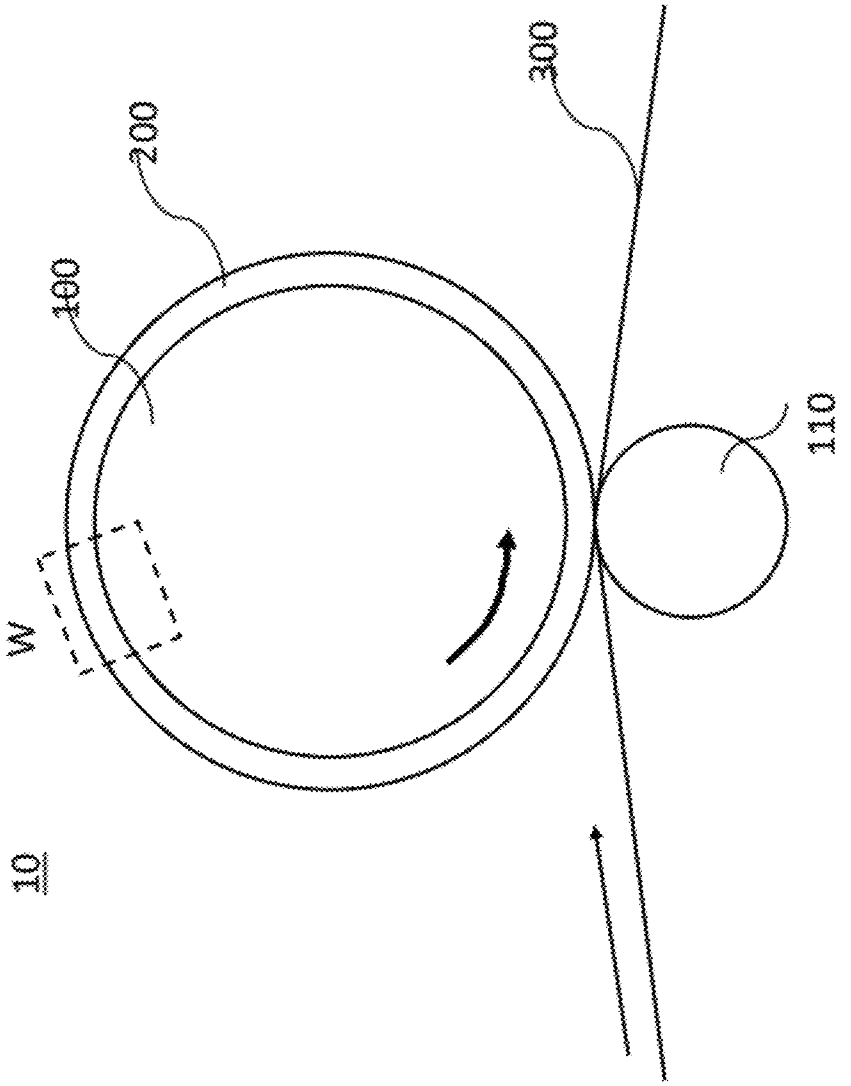
FIG. 1 is a schematic diagram showing an apparatus that employs an example electrophotographic photoreceptor according to an embodiment of the present invention.

Turning to FIG. 1, an electrophotographic printer employs an electrophotographic photoreceptor 10 in accordance with an embodiment of the present invention is shown. The electrophotographic photoreceptor 10 includes an OPC drum 100 and a photosensitive layer 200. The OPC drum 100 rotates along the arrow direction at a predetermined speed. The photosensitive layer 200 is disposed on the surface of the OPC drum 100 and envelops the OPC drum 100 lengthwise. The photosensitive layer 200 is charged at a positive or negative potential and irradiated with light to form a latent image corresponding to a desired pattern. A printing medium 300 is placed between the OPC drum 100 and a fixing shaft 110. When the printing medium 300 comes into contact with the electrophotographic photoreceptor 10 through the photosensitive layer 200, the charged particles on the photosensitive layer 200 are transferred to the printing medium 300. A development process is then carried out to fix color toners on the printing medium 300.

Figure 2:
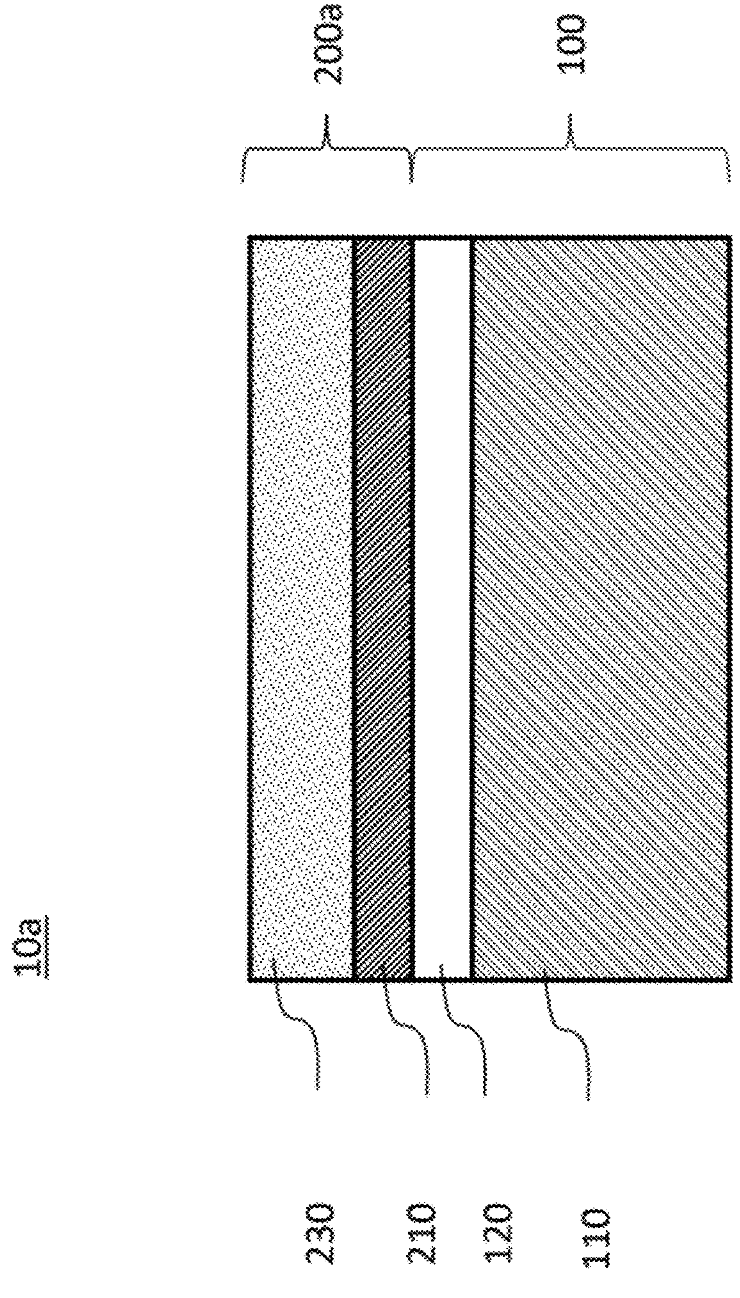
FIG. 2 is a schematic diagram showing an enlarged view of an electrophotographic photoreceptor according to an embodiment of the present invention.

Turning to FIG. 2, a schematic diagram of an enlarged view within the dotted area W of the electrophotographic photoreceptor 10 in FIG. 1 is shown. In this embodiment, the electrophotographic photoreceptor **10*a* includes the OPC drum 100 and a photosensitive layer 200*a*. The OPC drum 100 includes a conductive substrate 110 and an undercoat layer 120. The conductive substrate 110 may be configured to a cylinder, a belt, or a sheet. The surface of the conductive substrate 110 which interacts with the undercoat layer 120** undergoes electrochemical treatment such as positive electrode oxidation, blast processing, cutting process and the like.

The material of the conductive substrate 110 includes a metal, which may be, but is not limited to, aluminum, iron, nickel, copper, gold, stainless steel, and alloys or mixtures thereof.

The undercoat layer 120 is capable of conforming to the contour of the conductive substrate 110. The undercoat layer 120 has metal oxide particles and undercoat binder resin. The metal oxide particles have a powder resistance ranging between 1 Ωm and $10^{11}$ Ωm. The metal oxide particles may be, but are not limited to, tin oxide particles, titanium oxide particles, zinc oxide particles, and zirconium oxide particles, or a combination thereof.

The undercoat binder resin in the undercoat layer 120 may be, but is not limited to, acetal resin (e.g., polyvinyl butyral), polyvinyl alcohol resin, polyvinyl acetal resin, casein resin, polyamide resin, cellulose resin, gelatin, polyurethane resin, polyester resin, unsaturated polyester resin, methacrylic resin, acrylic resin, polyvinyl chloride resin, polyvinyl acetate resin, vinyl chloride-vinyl acetate-maleic anhydride resin, silicone resin, silicone-alkyd resin, urea resin, phenol resin, phenol-formaldehyde resin, melamine resin, urethane resin, alkyd resin and epoxy resin, zirconium chelate compounds, titanium chelate compounds, aluminum chelate compounds, titanium alkoxide compounds, organic titanium compounds, silane coupling agents, polyaniline, or a combination thereof.

In the formation of the undercoat layer 120, the metal oxide particles and the undercoat binder resin are dissolved in an undercoat solvent to form an undercoat coating solution. The undercoat coating solution is dip coated on the surface of the conductive substrate 110. The undercoat coating solution is then dried and set to form the undercoat layer 120 conforming to the conductive substrate 110.

In one embodiment, the undercoat solvent to dissolve the metal oxide particles and the undercoat binder resin may be, but is not limited to, alcohol-based solvents, ketone-based solvents, ether-based solvents, ester-based solvents, aromatic hydrocarbon-based solvent, and the like.

The method for coating the undercoat layer 120 on the conductive substrate 110 includes blade coating, wire bar coating, spray coating, dip coating, bead coating, air knife coating, and curtain coating. The thickness of the undercoat layer 120 ranges between 15 μm and 50 μm.

Still referring to FIG. 2, the photosensitive layer **200*a* includes a charge generation layer (CGL) 210, and a charge transport layer (CTL) 230. The CGL 210 is disposed on the undercoat layer 120 and conforms to the contour of the undercoat layer 120. In other words, the undercoat layer 120 is sandwiched in between the conductive substrate 110 and the CGL 210. The CGL 210** has a charge generating material and a CGL binder resin.

The charge generating material is selected from a first group of azo pigments, perylene pigments, polycyclic quinone pigments, indigo pigments, phthalocyanine pigments, squalelium pigments, and inorganic substances. Alternatively, the pigment can be selected from a second group of, but not limited to: monoazo, disazo, tris azo, metal phthalocyanine, nonmetal phthalocyanine, indio, thioindigo, perylene acid anhydride, perylene acid imide, anthraquinone, pyrene quinone, a pyrylium salt, a thiapytylium salt, triphenylmethane dye, selenium, selenium-tellurium, amorphous silicon.

The charge generating material can be selected from one or more of the materials in the first group and the second group. The charge generating material may be one or more combination of the compounds. An amount the charge generating material ranges between 10% and 90% by weight of the CGL 210.

The CGL binder resin may be, but is not limited to, a polyester resin, a polycarbonate resin, a polyvinyl acetal resin, a polyvinyl butyral resin, an acryl resin, a silicone resin, an epoxy resin, a melamine resin, a polyurethane resin, a phenol resin, a polyvinyl alcohol resin, a cellulose resin, a polystyrene resin, a polyvinyl acetate resin, a polyvinyl chloride resin, or a combination thereof. An amount of the CGL binder resin ranges between 10% and 90% by weight of the CGL 210.

In the formation of the CGL 210, the charge generating material and the CGL binder resin are dissolved in a charge generating solvent. The charge generating coating solution is dispensed on the undercoat layer 120 to form a charge generating film. The charge generating film is then dried to set to form the CGL 210.

The charge generating solvent should be selected based on the dispersion stability and solubility of the charge generating material and CGL binder resin. The charge generating solvent may be, but is not limited to, alcohol-based solvents, sulfoxide-based solvents, keto-based solvents, ether-based solvents, ester-based solvents, aromatic hydrocarbon-based solvents, or a combination thereof. The method for coating the CGL 210 over the undercoat layer 120 is selected from blade coating, wire bar coating, spray coating, dip coating, bead coating, air knife coating, and curtain coating. The thickness of the CGL 210 ranges between 0.1 μm to 1 μm.

The CTL 230 of the photosensitive layer 200*a* has a charge transport material, a CTL binder resin, a fluorine-containing resin, and polyhedral oligomeric silsesquioxane (POSS) particles. The charge transport material may be, but is not limited to, polycyclic aromatic compounds, heterocyclic compounds, hydrazone compounds, styryl compounds, enamine compounds, benzidine compounds, triarylamine compounds, and resins having a group derived from these materials. An amount of the charge transport material ranges between 25% and 70% by mass of the CTL 230.

The CTL binder resin may be, but is not limited to, polyester resin, a polycarbonate resin, an acryl resin, a polystyrene resin, or polymers having similar properties. The mass ratio between the CTL binder resin and the charge transport material ranges between 1:2 and 2:1.

The POSS particles are interconnected with fluorine groups and a first non-fluoridated group and/or a second non-fluoridated group. A representative structure of the POSS particles is shown in Formula 1-1 and Formula 1-2 as follows:

$$R^aR^1SiO_{3/2} \qquad \text{Formula (1-1)}$$

$$R^aR^1R^2SiO_{3/2} \qquad \text{Formula (1-2)},$$

Figure 4A:
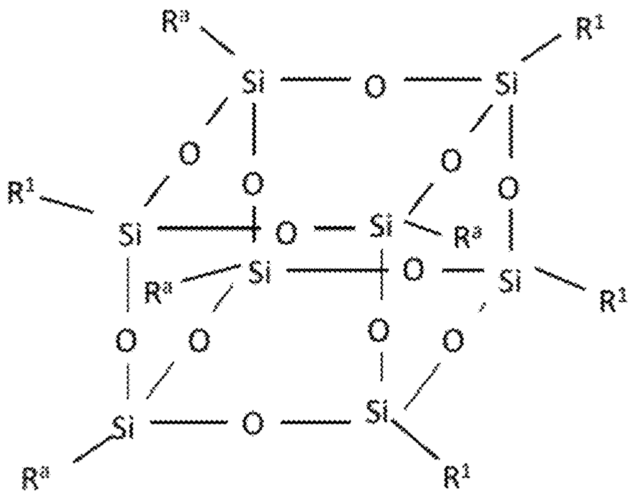
FIGS. 4A and 4B are schematic diagrams of individual POSS particle structure according to an embodiment of the present invention.

Turning to FIG. 4A in conjunction with Formula 1-1, $R^a$ represents the fluorine group, and W represents the first non-fluoridated group. The fluorine group $R^a$ is a monovalent group having at least one of a fluoroalkyl group and a fluoroalkylene group. The fluorine group $R^a$ is selected from the group consisting of 12,12,13,13,14,14,15,15,16,16,17,17,18,18,19,19,19-heptadecafluorononadecyl, 12,12,13,13,14,14,15,15,15-nonafluoropentadecyl, 12,12,13,13,14,14,15,15,16,16,17,17,17-tridecafluoroheptadecyl, 12,12,13,13,14,14,15,15,15-nonafluoropentadecyl, 12,12,13,13,14,14,15,15,16,16,17,17,18,18,19,19,19-heptadecafluorononadecyl, 12,12,13,13,14,14,15,15,16,16,17,17,17-tridecafluoroheptadecyl, 3,3,3-trifluoropropyl, heptadecafluorodecyl, tridecafluorooctyl, 3,3,3-trifluoropropyl, 1H,1H,2H,2H-Perfluorodecyl, heptadecafluorooctyl, Heptadecafluoro-1,1,2,2-tetradecyl, and Tridecafluoro-1,1,2,2-tetrahydrooctyl. The first non-fluoridated group $R^1$ has high compatibility with polycarbonate. The first non-fluoridated group $R^1$ is selected from the group consisting of propyl methacrylate, propylaniline, phenyl, 2-phenylethyl, 1-phenylethenyl, methylphenyl group, and diphenyl group. The molar ratio between the fluorine group $R^a$ and the first non-fluoridated group W ranges between 1:100 and 100:1.

Figure 4B:
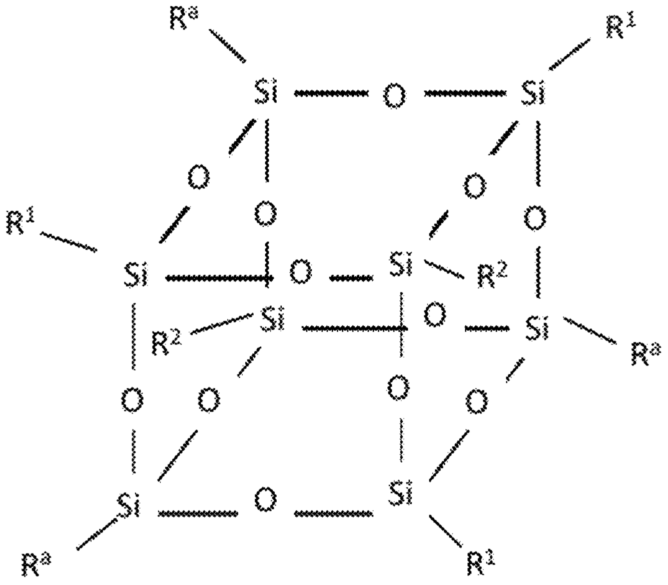

Turning to FIG. 4B in conjunction with Formula 1-2, $R^a$ and $R^1$ represent the same element as in Formula 1-1. $R^2$ represents a second non-fluoridated group. The difference between the first non-fluoridated group and the second non-fluoridated group arises from the fact that the second non-fluoridated group has a long chain of more than 1 $CH_2$.

In one embodiment, the second non-fluoridated group has a long chain of more than 5 $CH_2$.

In one embodiment, the second non-fluoridated group has a long chain of more than 10 $CH_2$.

Preferably, the second non-fluoridated group has a long chain of more than 11 $CH_2$.

More preferably, the second non-fluoridated group has a long chain of more than 12 $CH_2$.

The second non-fluoridated group $R^2$ is selected from the group consisting of octadecyl, dodecyl, polyethylene glycol (PEG). The molar ratio between the fluorine group $R^a$ and the combined value of the first non-fluoridated group W and the second non-fluoridated group $R^2$ ranges between 1:100 and 100:1.

Within the specified molar ratio between fluorine group $R^a$ and other groups, namely, the first non-fluorine group $R^1$ alone or the combination of the first and second non-fluorine groups $R^1$ and $R^2$, the affinity between the POSS particle and the fluorine-containing resin and the affinity between the POSS particle and CTL binder resin are balanced in order to achieve a stable dispersion. The content of the POSS particle ranges between 0.1% and 20% by mass of CTL binder resin. Different POSS particles that have different fluorine group and non-fluoridated group may be used alone or in combination of two or more.

The fluorine-containing resin is selected from tetrafluoroethylene resin, trifluorochloroethylene resins, vinyl fluoride resins, vinylidene fluoride resins, difluorodichloroethylene resins and copolymers thereof. The density of fluorine-containing resin ranges between 0.1 and 5 g/ml, and an average particle size ranges between 0.2 and 10 μm. A primary particle size ranges between 100 and 500 nm. The content of the fluorine containing particles ranges between 0.01% and 30% by mass of CTL binder resin.

In the formation of the CTL 230 as shown in FIG. 2, the charge transport material, CTL binder resin, fluorine-containing resin, and POSS particles are dissolved in a charge transport solvent. The charge transport solvent is selected from aromatic hydrocarbons such as benzene, toluene, xylene and chlorobenzene, ketones such as acetone and 2-butanone, methylene chloride, chloroform, ethylene chloride, halogenated aliphatic hydrocarbons, and organic solvents such as cyclic or linear ethers, for example, tetrahydrofuran and ethyl ether. All the solvents may be used alone or in a mixture of two or more. The method for coating the CTL 230 over the CGL 210 is selected from blade coating, wire bar coating, spray coating, dip coating, bead coating, air knife coating, and curtain coating. The thickness of the CTL 230 ranges between 5 and 50 μm. Turning to FIG. 2 in conjunction with FIG. 1, in this embodiment, the CTL 230 is the outermost layer of the photosensitive layer 200/200*a*.

Figure 3:
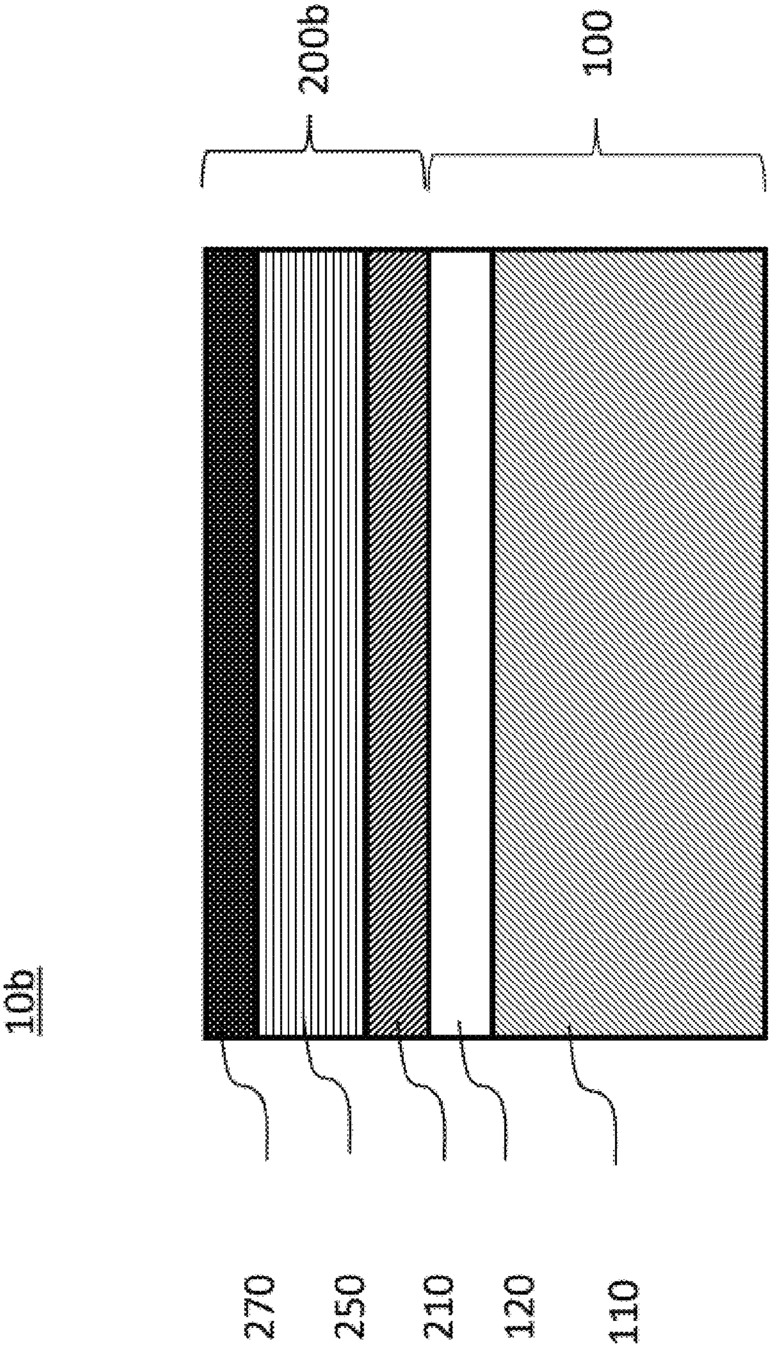
FIG. 3 is a schematic diagram showing an enlarged view of an electrophotographic photoreceptor according to an embodiment of the present invention.

Turning to FIG. 3, a schematic diagram of an enlarged view within the dotted area W of the electrophotographic photoreceptor 10 in FIG. 1 is shown. In this embodiment, the electrophotographic photoreceptor 10*b* includes the OPC drum 100 and a photosensitive layer 200*b*. The OPC drum 100 is substantially identical to the OPC drum 100 shown in FIG. 2. A detailed description of the OPC drum 100 including the conductive substrate 110 and the undercoat layer 120 can be found in the previous discussion, above. The photosensitive layer 200*b* as shown in FIG. 3 has the CGL layer 210, a simple CTL 250, and an overcoat layer 270. The CGL 210 shown in FIG. 3 is substantially identical to the CGL 210 in FIG. 2. A detailed description of the CGL 210 can be found in the previous discussion, above.

The difference between the simple CTL 250 shown in FIG. 3 and the CTL 230 shown in FIG. 2 arises from their composition. The simple CTL 250 includes the charge transport material and the CTL binder resin. The charge transport material and the CTL binder resin are substantially identical to those previously discussed in the CTL 230.

Still referring to FIG. 3, the overcoat layer 270 includes the fluorine-containing resin and POSS particles. The fluorine-containing resin and POSS particles are substantially identical to those previously discussed in the CTL 230. In this embodiment, the fluorine-containing resin and POSS particles are not incorporated in the simple CTL 250. The overcoat layer 270 becomes the outermost layer of the electrophotographic photoreceptor 10*b*. The simple CTL 250 is not exposed but sandwiched between the overcoat layer 270 and the CGL 210. The thickness of the simple CTL 250 and the overcoat layer 270 ranges between 5 and 50 μm respectively.

It should be understood that in the embodiments shown in FIGS. 2 and 3, the properties exhibited by these materials remain substantially the same. There are two types of affinities in the electrophotographic photoreceptor 10. The first type of affinity is the fluorine group $R^a$ of the POSS particle interacting with the fluorine-containing resin. The second type of affinity is the first and second non-fluorinated groups $R^1$ and $R^2$ of the POSS particle interacting with the CTL binder resin. The attraction between these two different types of affinity among these groups give rise to the durability of the electrophotographic photoreceptor 10 because the dispersion of the POSS particles is even and stable. In particular, the long chain of the second non-fluorinated group $R^2$ enhances the steric stabilization of the Si—O cage of the POSS particle. A stable, firm Si—O core can be held by the first and second non-fluorinated group $R^1$ and $R^2$. Due to the hardness provided by the stable, firm Si—O cage, the CTL 230 and the overcoat layer 270 are scratch resistant in which the thickness reduction of OPC during printing can be improved by 20% at least. The high compatibility of these groups also contributes to the even distribution of the POSS particles in the CTL 230 and the overcoat layer 270. Furthermore, the fluorine group $R^a$ of the POSS particles has another function as a lubricant. The presence of the fluorine groups W and fluorine-containing resin provides a secondary function of higher lubricity of the CTL 230 and overcoat layer 270. The addition of the POSS particles and fluorine-containing resin and their interaction with the charge transport material and CTL binder resin has neglectable effect on the electronic and optical properties of the charge transport material and the CTL binder resin.

EXAMPLES

Example 1

Preparation of POSS Particle (P1)

In a reactor, 15 g of 3-(trimethoxysilyl)propyl methacrylate, 5 g mPEG20K-Silane and 10 g of 12,12,13,13,14,14,15,15,15-nonafluoropentadecyl triethoxysilane are mixed with approximately 50 to 200 g of acetone. Next, the mixture reacts at a temperature between 30 and 70° C. After 30 minutes, 3 to 10 g of 5% aqueous solution of potassium carbonate is added dropwise to the reaction mixture. After another 30 minutes, 20 to 100 g of water is added dropwise to the reaction mixture. The reaction product is kept at between 30 and 70° C. for 3 to 12 hours.

The reaction product undergoes hydrolysis and condensation reaction, and then it is cooled and washed with water and extracted with ethyl acetate. The upper layer is collected and dried with magnesium sulfate. Finally, the solvent in the solution is distilled off at 60° C. This yielded a white powder (a fluorine, acrylate and PEG chain containing POSS particle). The structure of this multifunctional POSS can be tuned by the ratio of trimethoxy(2-phenylethyl)silane and (tridecafluoro-1,1,2,2-tetrahydrooctyl)silane.

Example 2

Preparation of a Dispersion Solution (D1) of POSS Particle and Fluorine-Containing Resin A dispersion solution (D1) of POSS particle and fluorine-containing resin is prepared by blending 2% by weight of POSS particle (P1) and 18% by weight of polytetrahydrofuran (PTFE) nanoparticle in an 80% by weight of tetrahydrofuran (THF). After mixing with stirring at 50° C. for 100 minutes, the dispersion solution D1 is obtained. Dispersion solution D1 is a transparent, liquid product.

Example 3

Preparation of a Dispersion Solution (D2) of POSS Particle and Fluorine-Containing Resin A dispersion solution (D2) of POSS particle and fluorine-containing resin is prepared by blending 2.5% by weight of a fluorine, acrylate and PEG containing POSS particle (P1) and 12% by weight of PTFE nanoparticle in an 85.5% by weight of THF. After mixing with stirring at 80° C. for 100 minutes, the dispersion solution D2 is obtained. Dispersion solution D2 is a transparent, liquid product.

Example 4

Fabrication of Electrophotographic Photoreceptor

For the conductive substrate, an aluminum cylinder having a length of 300 mm, a thickness of 0.5 mm, and a diameter of 30 mm is prepared. The undercoat layer is prepared as follows. Zirconium acetylacetonate tributooxide (35% by weight) and poly (vinyl butyral) BM-S (3% by weight) are dissolved in n-butanol (62% by weight) and stirred to form a coating solution for the undercoat layer. The coating solution of undercoat layer is coated on the conductive substrate via dip coating on the conductive support, and the resulting layer is dried at 135° C. for 30 minutes. The thickness of the undercoat layer after drying is approximately 2.0 μm.

A CGL is prepared as follows. Hydroxygallium phthalocyanine (1.6% by weight) and polyvinyl butyal resin (1.0% by weight) are dissolved in a mixture of cyclohexanone (48.7% by weight) and ethyl acetate (48.7% by weight) to form a coating solution for CGL. The coating solution of CGL was coated on the undercoat layer via dip coating on the undercoat layer, and the resulting layer was dried at 80° C. for 15 minutes. The thickness of the dried CGL is approximately 0.2 μm.

The CTL/overcoat layer is prepared as follows. N,N'-diphenyl-N,N-bis(3-methylphenyl)-1.1'-biphenyl-4,4'-diamine (15% by weight) and polycarbonate resin (15% by weight) are dissolved in THF (70% by weight) to form a first solution (S1) of coating solution for CTL/overcoating layer. Dispersion solution D1 is then added to the first solution S1 to form an intermediate solution. The mass ratio of D1 to S1 is 3:25. Next, the intermediate solution is dispersed by a homogenizer at 1000 rpm for 30 minutes to obtain a coating solution for the CTL/overcoat layer. This coating solution is coated via dip coating on the CGL. The resulting layer is dried at 110° C. for 1 hour. The thickness of the dried CTL/overcoat layer is approximately 30 μm. The electrophotographic photoreceptor is then complete.

Example 5

Evaluation of Dispersion Solution D1 and D2

The dispersion property of POSS particles in the dispersion solution D1 and D2 is evaluated through a NanoBrook Serice Particle Sizer and Zeta Potential Analyzer. The effective diameter of the particles in D1 and D2 is maintained at a primary size level of about 400 nm and the polydispersity value should not be higher than 0.5.

Example 6

Evaluation of CTL/Overcoat Layer Coating Solution

The dispersion property of POSS particles in the CTL/overcoat layer coating solution is evaluated as follows. An amount of 20 ml CTL/overcoat layer coating solution prepared in Example 4 is transferred into a 50 ml centrifuge tube, and centrifugation is performed at 10000 rpm for 5 minutes. After centrifugation, the coating solution remains transparent and no sediment is found in the tube.

Example 7

Evaluation of OPC Wear Resistance

OPC from EXAMPLE 4 used in cartridge for HP 604 printer is evaluated quantitatively in printing consumption according to ISO/IEC 19752. The wear resistance is calculated based on the thickness reduction of OPC CTL after 10000 page printing. The wear resistance of EXAMPLE 4 coating is below 1.0 um/10000 page printing. In comparison, the commercial one is above 1.2 um/10000 page printing. At same time, the charge transfer function and printing quality of the OPC from EXAMPLE 4 are same to the commercial one.

It should be noted that the above-mentioned embodiments are only for illustrating the technical solutions of the present invention and not for limiting, and although the present invention has been described in detail with reference to the preferred embodiments, it should be understood by those skilled in the art that modifications or equivalent substitutions may be made on the technical solutions of the present invention without departing from the spirit and scope of the technical solutions of the present invention, which should be covered by the claims of the present invention.

As used herein, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all the ranges disclosed in the present disclosure include endpoints. The term "substantially coplanar" may refer to two surfaces within a few micrometers (μm) positioned along the same plane, for example, within 10 μm, within 5 μm, within 1 μm, or within 0.5 μm located along the same plane. When reference is made to "substantially" the same numerical value or characteristic, the term may refer to a value within ±10%, ±5%, ±1%, or ±0.5% of the average of the values.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

It will be appreciated by those skilled in the art, in view of these teachings, that alternative embodiments may be implemented without undue experimentation or deviation from the spirit or scope of the invention, as set forth in the appended claims. This invention is to be limited only by the following claims, which include all such embodiments and modifications when viewed in conjunction with the above specification and accompanying drawings.

The invention claimed is:

1. A scratch-resistant and durable electrophotographic photoreceptor, comprising:

a conductive substrate;

an undercoat layer disposed on the conductive substrate and capable of conforming to the contour of the conductive substrate;

a photoconductor charge generation layer disposed on the undercoat layer and capable of conforming to the contour of the undercoat layer; and a charge transport layer disposed on the photoconductor charge generation layer, wherein the charge transport layer comprises a charge transport material, a binder resin, a fluorine-containing resin, and a plurality of polyhedral oligomeric silsesquioxane (POSS) particles evenly dispersed in the binder resin;

wherein the POSS particles have a structure represented by Formula (1-1) or Formula (1-2):

$$R^aR^1SiO_{3/2} \quad \text{Formula (1-1)}$$

$$R^aR^1R^2SiO_{3/2} \quad \text{Formula (1-2);}$$

wherein $R^a$ represents at least one fluorine group selected from the group consisting of 12,12,13,13,14,14,15,15,16,16,17,17,18,18,19,19,19-heptadecafluorononadecyl, 12, 12, 13,13, 14, 14, 15, 15,15-nonafluoropentadecyl, 12, 12, 13, 13, 14, 14, 15, 15, 16, 16, 17, 17, 17-tridecafluoroheptadecyl, 12,12,13,13,14,14,15,15,15-nonafluoropentadecyl, 12,12,13,13,14,14,15,15,16,16,17,17,18,18,19,19,19-heptadecafluorononadecyl, 12,12,13,13,14,14,15,15,16,16,17,17,17-tridecafluoroheptadecyl, 3,3,3-trifluoropropyl, heptadecafluorodecyl, tridecafluorooctyl, 3,3,3-trifluoropropyl, 1H,1H,2H,2H-perfluorodecyl, heptadecafluorooctyl, heptadecafluoro-1,1,2,2-tetradecyl, and tridecafluoro-1,1,2,2-tetrahydrooctyl;

wherein $R^1$ represents a first non-fluoridated group, and $R^2$ represents a second non-fluoridated group;

wherein the second non-fluoridated group has a long chain of $CH_2$ of more than $1CH_2$;

wherein the first non-fluoridated group is selected from the group consisting of propyl methacrylate, propylaniline, phenyl, 2-phenylethyl, 1-phenylethenyl, methylphenyl group, and diphenyl group; and wherein the second non-fluoridated group is selected from the group consisting of octadecyl, dodecyl, and polyethylene glycol (PEG).

2. The scratch-resistant and durable electrophotographic photoreceptor of claim 1, wherein the charge transport material is selected from the group consisting of polycyclic aromatic compounds, heterocyclic compounds, hydrazone compounds, styryl compounds, enamine compounds, benzidine compounds and triarylamine compounds.

3. The scratch-resistant and durable electrophotographic photoreceptor of claim 1, wherein the binder resin is selected from the group consisting of polyester resin, a polycarbonate resin, an acryl resin and a polystyrene resin.

4. The scratch-resistant and durable electrophotographic photoreceptor of claim 1, wherein the fluorine-containing resin is selected from the group consisting of tetrafluoroethylene resin, trifluorochloroethylene resins, vinyl fluoride resins, vinylidene fluoride resins, difluorodichloroethylene resins and copolymers thereof.

5. The scratch-resistant and durable electrophotographic photoreceptor of claim 1, wherein a content of the fluorine-containing POSS in the charge transport layer ranges from 0.1% to 20% by mass.

6. The scratch-resistant and durable electrophotographic photoreceptor of claim 1, wherein the undercoat layer has a thickness in a range of 15 μm to 50 μm, the photoconductor charge generation layer has a thickness in a range of 0.1 μm to 1 μm, and the charge transport layer has a thickness in a range of 5 to 50 μm.

7. A scratch-resistant and durable electrophotographic photoreceptor, comprising:

a conductive substrate;

an undercoat layer disposed on the conductive substrate and capable of conforming to the contour of the conductive substrate;

a photoconductor charge generation layer disposed on the undercoat layer and capable of conforming to the contour of the undercoat layer;

a charge transport layer disposed on the photoconductor charge generation layer, wherein the charge transport layer comprises a charge transport material, a binder resin; and an overcoat layer disposed on the charge transport layer, wherein the overcoat layer comprises a fluorine-containing resin and a plurality of polyhedral oligomeric silsesquioxane (POSS) particles evenly dispersed in the fluorine-containing resin;

wherein the scratch-resistant and durable electrophotographic photoreceptor has a durability of below 1.0 um/10000 page printing, as determined by standard page printing test according to ISO/IEC 19752;

wherein the POSS particles have a structure represented by Formula (1-1) or Formula (1-2):

$$R^aR^1SiO_{3/2} \quad \text{Formula (1-1)}$$

$$R^aR^1R^2SiO_{3/2} \quad \text{Formula (1-2);}$$

wherein $R^a$ represents at least one fluorine group selected from the group consisting of 12,12,13,13,14,14,15,15,16,16,17,17,18,18,19,19,19-heptadecafluorononadecyl, 12,12, 13, 13, 14, 14, 15, 15, 15-nonafluoropentadecyl, 12,12,13,13,14,14,15,15,16,16,17,17,17-tridecafluoroheptadecyl, 12,12,13,13,14, 14, 15,15, 15-nonafluoropentadecyl, 12,12,13,13,14,14,15,15,16,16,17,17,18,18,19,19,19-heptadecafluorononadecyl, 12,12,13,13,14,14,15,15,16,16,17,17,17-tridecafluoroheptadecyl, 3,3,3-trifluoropropyl, heptadecafluorodecyl, tridecafluorooctyl, 3,3,3-trifluoropropyl, 1H,1H,2H,2H-perfluorodecyl, heptadecafluorooctyl, heptadecafluoro-1,1,2,2-tetradecyl, and tridecafluoro-1,1,2,2-tetrahydrooctyl;

wherein $R^1$ represents a first non-fluoridated group, and $R^2$ represents a second non-fluoridated group;

wherein the second non-fluoridated group has a long chain of $CH_2$ of more than $1CH_2$;

wherein the first non-fluoridated group is selected from the group consisting of propyl methacrylate, propylaniline, phenyl, 2-phenylethyl, 1-phenylethenyl, methylphenyl group, and diphenyl group; and wherein the second non-fluoridated group is selected from the group consisting of octadecyl, dodecyl, and polyethylene glycol (PEG).

8. The scratch-resistant and durable electrophotographic photoreceptor of claim 7, wherein the charge transport material is selected from the group consisting of polycyclic aromatic compounds, heterocyclic compounds, hydrazone compounds, styryl compounds, enamine compounds, benzidine compounds and triarylamine compounds.

9. The scratch-resistant and durable electrophotographic photoreceptor of claim 7, wherein the binder resin is selected from the group consisting of polyester resin, a polycarbonate resin, an acryl resin and a polystyrene resin.

10. The scratch-resistant and durable electrophotographic photoreceptor of claim 7, wherein the fluorine-containing resin is selected from the group consisting of tetrafluoroethylene resin, trifluorochloroethylene resins, vinyl fluoride resins, vinylidene fluoride resins, difluorodichloroethylene resins and copolymers thereof.

11. The scratch-resistant and durable electrophotographic photoreceptor of claim 7, wherein a content of the fluorine-containing POSS in the charge transport layer ranges from 0.1% to 20% by mass.

12. The scratch-resistant and durable electrophotographic photoreceptor of claim 7, wherein the undercoat layer has a thickness in a range of 15 μm to 50 μm, the photoconductor charge generation layer has a thickness in a range of 0.1 μm to 1 μm, the charge transport layer has a thickness in a range of 5 to 50 μm, and the overcoat layer has a thickness in a range of 5 to 50 um.

* * * * *